United States Patent [19]

Stansfield

[11] Patent Number: 4,613,897
[45] Date of Patent: Sep. 23, 1986

[54] REPRODUCTION OF COLORED IMAGES

[75] Inventor: Peter W. Stansfield, Hertfordshire, England

[73] Assignee: Crosfield Electronics (USA) Limited, London, England

[21] Appl. No.: 785,377

[22] Filed: Oct. 8, 1985

[30] Foreign Application Priority Data

Oct. 8, 1984 [GB] United Kingdom ................. 8425339

[51] Int. Cl.$^4$ ............................................. H04N 1/46
[52] U.S. Cl. ........................................ 358/80; 358/75
[58] Field of Search ........................ 358/75, 78, 79, 80

[56] References Cited

U.S. PATENT DOCUMENTS

| 3,801,736 | 4/1974 | Kosoha et al. | 358/80 |
| 3,893,166 | 7/1975 | Pugsley | 358/80 |
| 4,346,402 | 8/1982 | Pugsley | 358/80 |

FOREIGN PATENT DOCUMENTS

| 0142975 | 5/1985 | European Pat. Off. | 358/75 |
| 1294351 | 10/1972 | United Kingdom . | |

Primary Examiner—James J. Groody
Assistant Examiner—John C. Fox
Attorney, Agent, or Firm—Sughrue, Mion, Zinn, Macpeak and Seas

[57] ABSTRACT

In color printing, it is customary to analyze the color content of an original using red, blue and green filters and to make color-component printers for the complementary colors, i.e. cyan, magenta, and yellow, with or without a black printer. The present invention concerns the preparation of a special color printer for a printing ink the color of which is not complementary to one of the said filters, for example a brown separation. According to the invention, sets of values (Ybr, Mbr, Cbr) defining the characteristic elements of curves for yellow, magenta and cyan, which curves together correspond to a range of values for the required color separation, are stored. For each picture element, a combination of color-component values for yellow, magenta and cyan (Y, M, C), are derived and are compared with different sets of values (Ybr, Mbr, Cbr) derived from the stored curve elements, each set corresponding to a different value of the required special-color separation (Br). A value is selected for the desired special-color separation for which each of the stored values of the related set (Ybr, Mbr, Cbr) is not greater than the corresponding value (Y, M, C) derived from the picture element of the original. When, in addition to the color-component signals derived for a picture element of the original, a black signal is also derived, the stored curve-representing values for the special-color separation may include values defining a curve for black.

8 Claims, 4 Drawing Figures

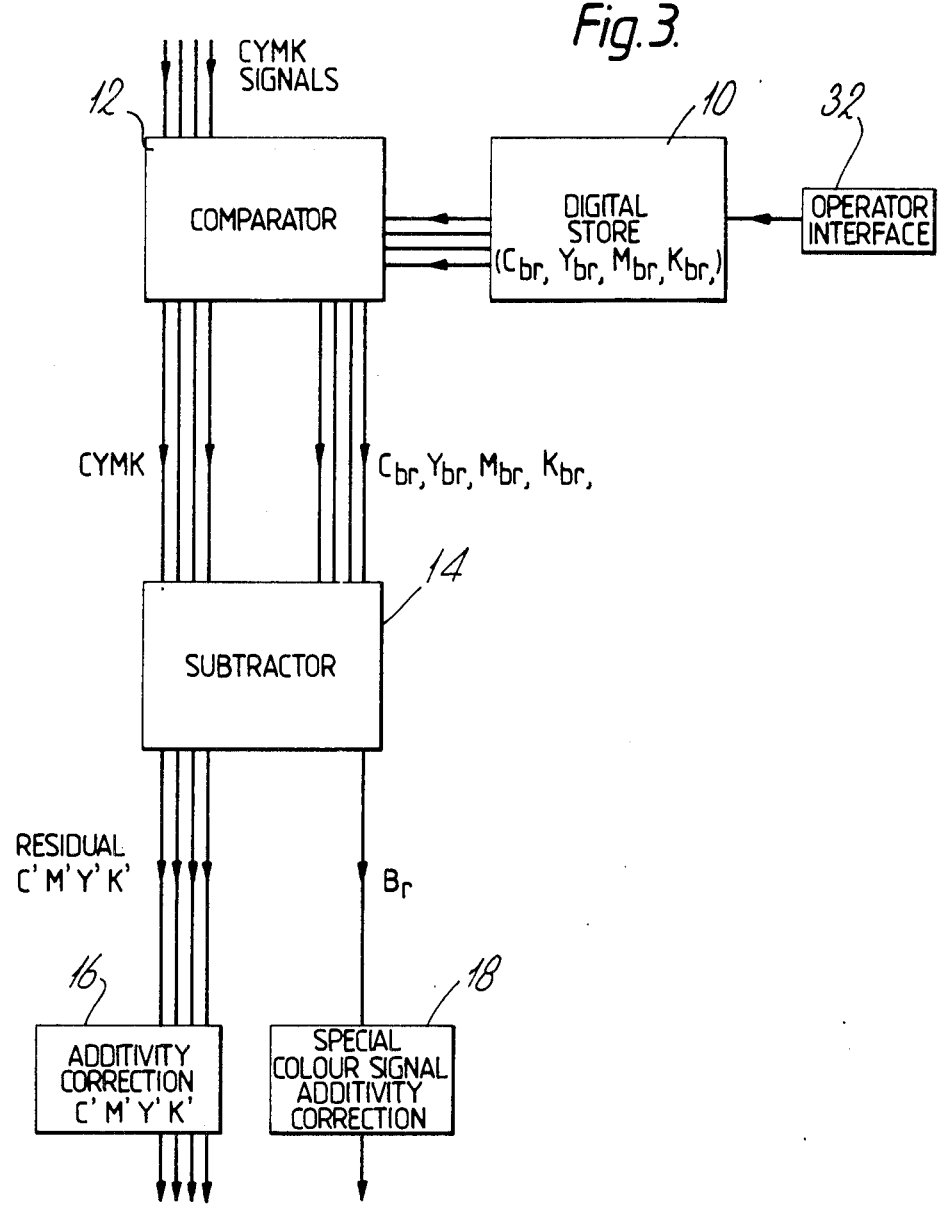

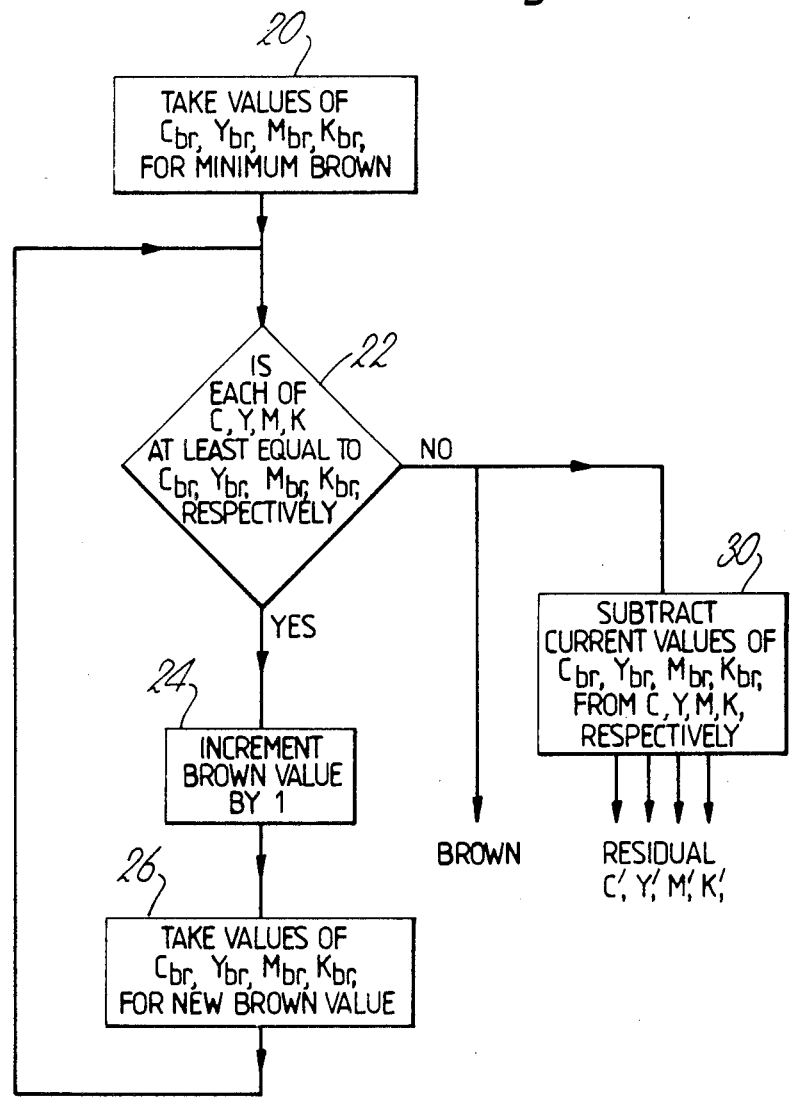

REPRODUCTION OF COLORED IMAGES

Colour printing is normally carried out by making a set of individual black-and-white colour separation transparencies, each having density values corresponding to the values in the original of the colour component which the separation represents. It is customary to produce colour separations from the red, green and blue components and to use these to make colour printers which are used to print images in cyan, magenta and yellow respectively, these colours being complementary to the red, blue and green of the filters. Colour correction is carried out before the colour printers are produced to compensate for various process non-linearities and also for the fact that the cyan, magenta and yellow printer inks are not exactly complementary in colour to the red, green and blue filters.

It is sometimes required, in the printing of the final image, to include an ink of a different colour, for example a brown ink. The use of a brown ink is particularly advantageous in the food packaging industry, where very careful control over different brown tones is required. There is a further factor, namely that the colours which can be obtained using the conventional printing colours are limited by the colour triangle for these colours and many brown tones fall outside this colour triangle.

The production of a special colour separation for a colour component other than cyan, yellow, magenta and black has previously been proposed. In one earlier proposal the colour separation was produced by a "split filter" photographic exposure, i.e. by exposing a photographic film through a first (e.g. red) filter for a first period of time and then exposing it through a second (e.g. green) filter for a second period of time, which in general will be different from the first period. Such a method, however, was followed by hand retouching to remove unwanted tones.

In our British Pat. No. 1294351 we described a method of preparing a colour separation representing a colour component which is not complementary to a filter colour and which eliminated the split photographic exposure and hand retouching. In this method, a coloured original was scanned through conventional red, green and blue filters to derive electrical signals representing red, green and blue components of the picture elements of the original. These signals were applied to a correcting circuit which produced corrected colour component signals representing ranges of colour which were more limited than those represented by the signals derived by scanning. Selected ones of these corrected colour component signals were applied through gain-control circuits to a mixer circuit to give a resulting signal which was used in the preparation of the required special-ink colour separation. In effect, the split exposure of the earlier process was replaced by the electronic mixing of signals; the hand-retouching was replaced by the adjustment of controls in the correcting circuit which determined the boundaries of the colour ranges represented by the corrected colour component signals, in such a manner that the signal resulting from mixing the corrected signals represented only the required special colour.

However, in the above method, the controls in the correcting circuit, whilst they could be varied to give colour separations of different special hues, were fixed for all values of brightness and saturation of a given special hue in the production of a given colour separation.

The present invention consists in a method of reproducing a coloured original picture for which signals representing red, green and blue components of the original have been derived and including preparing a colour separation representing a colour which is not complementary to red, green or blue, comprising: storing values defining at least the characteristic elements of curves which respectively represent yellow, magenta and cyan component values which together correspond to a range of values for the required special colour separation; comparing a combination of picture-element values for yellow, magenta and cyan derived from the red, green and blue component signals for each picture element, with different sets of yellow, magenta and cyan values derived from the above-mentioned curves and corresponding to different values for the required special-colour separation; and selecting a value for the desired special-colour separation for which each of the yellow, magenta and cyan values of the said set is not greater than the corresponding value derived from the picture element, the selected value for the special-colour separation varying with the picture-element values for yellow, magenta and cyan.

In a modification of this method, the stored values define at least the characteristic elements of curves which respectively represent values of black and at least two of yellow, magenta and cyan, which together correspond to a range of values for the required special colour separation, and the blue, green and red colour-component signals are used to derive values of black and at least two of yellow, magenta and cyan for each picture element, the combination of values derived from each picture element being compared with different sets of values representing the said curves; the value selected for the desired special colour separation being such that each of the values in the said set, related to the selected special colour separation, is smaller than the corresponding picture-element value.

In order that the invention may be better understood, an example of a method embodying the invention will now be described with reference to the accompanying drawings, in which FIG. 1 shows curves of yellow, magenta and cyan values corresponding to different values of a special colour separation;

FIG. 3 shows diagrammatically one embodiment of a circuit for carrying the invention into effect; and FIG. 4 is a flow diagram illustrating the operation of the circuit of FIG. 3.

It will be assumed that the required special colour is a brown which, for a 50% brown dot size, is defined by 30% yellow, 20% magenta and 15% cyan. As shown by the curves, these percentage values are not maintained throughout the range of brown dot sizes (0–100%). The reason for this is that inks are not simply additive, colour intensity varies non-linearly with ink thickness, and dot percentage is not linear with density.

Figure 1:
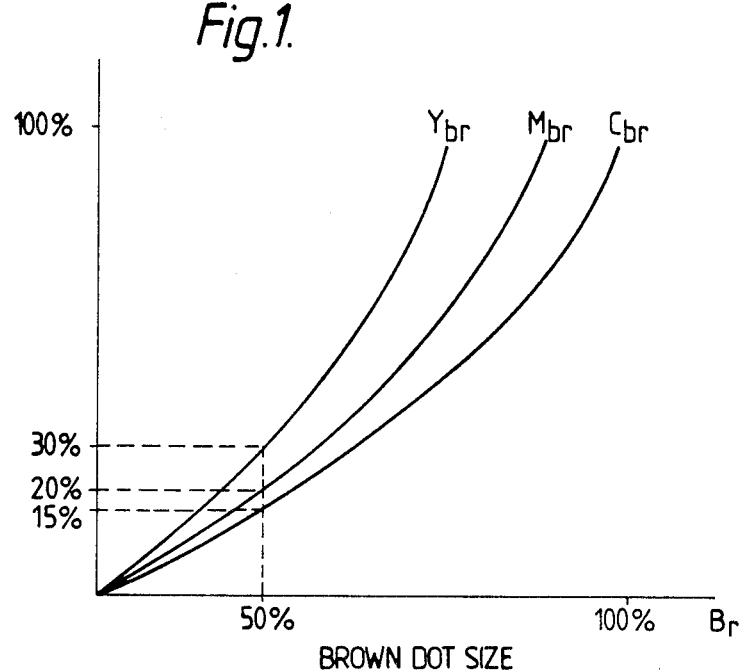

Values representing the curves shown in FIG. 1 (or at least characteristic elements of these curves) are stored for comparison with the yellow, magenta and cyan values obtained for each pixel of the coloured image to be reproduced.

Figure 2:
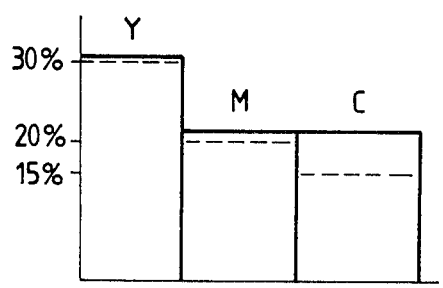
FIG. 2 is a histogram used in explanation of FIG. 1.

It is assumed in FIG. 2 that for one particular picture element, the yellow value is about 30% of saturated yellow, the magenta value is just over 20% of saturated magenta, and the cyan value is the same as the magenta value. These values are indicated by full lines in FIG. 2.

By comparing these values with different sets of values obtained from FIG. 1 (each set of values corresponding to a brown dot of a different size), it is found that a brown dot of 50% size is the maximum for which the corresponding yellow, magenta and cyan values (indicated by dotted lines in FIG. 2) are all not greater than the image picture element values for the corresponding colour components. The yellow signal for the image picture element is in this case the limiting signal for the brown dot size (50%), as the magenta and cyan picture-element components are less than the values obtained from the corresponding curves of FIG. 1 for a 50% value of brown dot size. Thus, for this particular element the limiting colour component is the maximum of the three picture-element components; if the magenta and cyan picture-element components were higher than 30% (FIG. 2), the yellow picture-element component would be the minimum of the three components but would still be the limiting signal determining the size of the brown dot.

As a consequence, the amount of "brown" that can be removed from the image picture element values is represented by the amounts below the dotted lines in FIG. 2; these amounts can either be wholly replaced by a brown printer signal, or partially replaced by a brown printer signal (for example using a 50% brown printer signal and 5% black printer signal).

The remaining signals are then additively corrected.

A diagrammatic representation of the circuits necessary to carry out the invention is given in FIG. 3 and a flow diagram illustrating the operation of the circuit is shown in FIG. 4. In FIG. 3, the reference 10 indicates an indexed data store for the special colour separation ink, i.e. a store holding data representing the curves of FIG. 1, except that in the case of FIG. 3 a black curve (Kbr) is also included. Input pixels (C, M, Y, K) for the image elements are applied to a comparator 12 connected to the store 10. Initially values of Cbr, Ybr, Mbr and Kbr for minimum brown are taken from store 10 and applied to the comparator (see step 20 in FIG. 4) The comparator checks to ascertain whether each of the C, M, Y and K values for a given picture element is not less than, i.e. at least equal to the corresponding one of a set of store values for the selected brown dot size (step 22). If each of the C, M, Y and K picture-element values is less than the corresponding store value, the data store index is incremented by one (step 24), values of Cbr, Ybr, Mbr and Kbr for the next brown value are extracted from store (step 26), and step 22 is repeated i.e. the comparator check is made again using the new values. When one of the C, M, Y and K picture-element values is just equal to the corresponding one of the incoming pixel values i.e. when step 22 gives a negative answer, then that value of the index becomes the "brown" value Br (line 28). The Cbr, Mbr, Ybr and Kbr stored equivalents for this brown value are then subtracted (step 30) from the incoming pixel values in a subtractor circuit 14 (FIG. 3) to "correct" for the brown separation. The residual signals C', M', Y' and K' and the brown signal Br are corrected for additivity failure in circuits 16 and 18 respectively. The circuits 16 and 18 are of known design and form no part of the present invention.

Of course, partial replacement can be achieved by comparing for example 60% of the incoming pixel values with the stored values; alternatively, an operator may define at an operator interface 32, how much of the maximum brown value is reproduced in brown ink.

It will be seen that this method takes into account the non-linear nature fo the curves shown in FIG. 1 and therefore produces more accurately the required brown separation than the method described in our earlier British Pat. No. 1294351. The non-linear nature of the curves is due to two types of ink non-linearity. One of these, termed "proportionality" relates to the non-linear effects which appear to change the colour of one ink (printed alone) with dot size. Another, termed "additivity" relates to the combination of non-linear effects which make densities add together in a non-linear manner when one ink is overprinted with another.

It will also be appreciated that the same solid print densities of brown can be obtained using different reproduction curves. Thus, if the Y, M and C curves of FIG. 1 were each made more concave, while preserving the same general relationship between them, the same solid print densities of brown would be achieved in the image but there would be a mid-tone dot loss. Similarly, if the curves were made convex, while preserving the same general relationship between them, the same solid print densities would be obtained but there would be a mid-tone dot gain.

Once the data store has been loaded for the special colour separation, no adjustment is required.

The method described in this application is to be distinguished from the conventional method of obtaining a black printer separation in which, for balanced inks, the value of the black printer signal is less than or equal to the minimum of the values for yellow, magenta and cyan, and in which equal amounts of yellow, magenta and cyan are deducted from the original signals in an "undercolour removal" process to compensate for the use of the black printer.

When a black printer is used and the black signal replaces the whole of the minimum colour component, the method of the present invention may be performed by providing stored values for a special-colour separation which define curves for black and two of the three colour components (yellow, magenta and cyan).

A further advantage of the present invention is that it allows "thresholding", in which brown replacement is performed only in certain parts of the tonal range, for example in the shadows. This is an important advantage for the printing industry and can be simply accomplished by loading the first n entries of the "special colour separation" data store with zeros. Replacement of the colour components by brown will then not start until there is n % of the lowest curve (C in FIG. 1). Thus, if n=50, replacement by brown will start in the mid-tones.

I claim:

1. A method of reproducing a coloured original picture for which signals representing blue, green and red components of the original have been derived and including preparing a colour separation representing a colour which is not complementary to blue, green or red, comprising:

storing values defining at least the characteristic elements of curves (FIG. 1) which respectively represent yellow, magenta and cyan component values (Ybr, Mbr, Cbr) which together correspond to a range of values for the required special colour separation;

comparing a combination of picture element values for yellow, magenta and cyan (Y,M,C), derived from the blue, green and red component signals for each picture element, with different sets of yellow, magenta and cyan values (Ybr, Mbr, Cbr) derived from the above-mentioned curves and corresponding to different values for the required special-colour separation (Br);

and selecting a value for the desired special-colour separation for which each of the yellow, magenta and cyan values of the said set (Ybr, Mbr, Cbr) is not greater than the corresponding value (Y,M,C) derived from the picture element, the selected value for the special-colour separation varying with the picture-element values for yellow, magenta and cyan.

2. A method in accordance with claim 1, in which the special-colour separation is a brown separation.

3. A method in accordance with claim 1, in which the value for the desired colour separation is the maximum value for which each of the colour-component values of the said set is not greater than the corresponding image picture-element value.

4. A method in accordance with claim 1, in which the value for the desired special-colour separation is not the maximum value for which each of the colour-component values of the said set is not greater than the corresponding image picture element value, and in which the colour-component and special-colour separations are supplemented by a black printer separation.

5. A method in accordance with claim 1, in which the special colour separation is used in only a part of the tonal range.

6. A method of reproducing a coloured original picture for which signals representing blue, green and red components of the original have been derived and including preparing a colour separation representing a colour which is not complementary to blue, green or red, comprising:

storing values of black (Kbr) and at least two of yellow magenta and cyan (Ybr, Mbr, Cbr), the stored values defining at least the characteristic element of curves (FIG. 1) which respectively represent black and at least two of yellow, magenta and cyan, and which in combination correspond to a range of values for the required special colour separation (Br);

deriving from the blue, green and red component signals for each picture element, values of black and at least two of yellow, magenta and cyan and comparing the said derived values with different sets of stored values derived from the above-mentioned curves and corresponding to different values for the required special-colour separation (Br);

and selecting a value for the desired special-colour separation which varies with the picture-element colour-component values and for which each of the stored values of the said set is not greater than the corresponding value derived from the picture element.

7. Apparatus for reproducing a coloured original picture for which signals representing red, green and blue components of the original have been derived, the coloured original being reproduced using at least one colour separation which is not complementary to red, green or blue, the apparatus comprising:

a store (10) in which are held at least the characteristic elements of curves which respectively represent yellow, magenta and cyan component values (Ybr, Mbr, Cbr) which together corresponds to a range of values for the required special separation (Br);

means (12) comparing a combination of values of yellow, magenta and cyan (Y,M,C), derived from the blue, green and red values for a given picture element of the original, with different sets of yellow, magenta and cyan values (Ybr, Mbr, Cbr) derived from the said stored curve elements and corresponding to different values for the required special-colour separation, and selecting a value for the corresponding picture element of the desired special-colour separation for which each of the yellow, magenta and cyan values derived from the curves is not greater than the corresponding picture element value derived from the original;

and means (14) for removing from the yellow, magenta and cyan picture-element values the cyan, magenta and yellow stored equivalents for the selected value of the special-colour separation.

8. Apparatus in accordance with claim 7, in which the store holds values defining at least the characteristic elements of curves which respectively represent black (Kbr) and at least two of yellow, magenta and cyan values (Ybr, Mbr, Cbr) which together correspond to a range of values for the required special colour separation, in which the means providing the image picture-element colour component values also provides a black value signal (K) for each picture-element, and in which the comparing means (12) compares the combination of picture-element values with respective ones of the different sets of values derived from the said curves, the value selected for the picture element of the desired special colour separation being such that each of the stored values in the set related to the special-colour separation value is not greater than the corresponding picture-element value derived from the original.

* * * * *